United States Patent
Huang et al.

(10) Patent No.: US 8,925,898 B2
(45) Date of Patent: Jan. 6, 2015

(54) PLUG MEMBER OF GAS VALVE

(71) Applicant: Grand Mate Co., Ltd., Taichung (TW)

(72) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Kuan-Chou Lin, Taichung (TW);
Yen-Jen Yeh, Yunlin (TW)

(73) Assignee: Grand Mate Co., Ltd., Taichung (TW)

( * ) Notice: Subject to any disclaimer, the term of this patent is extended or adjusted under 35 U.S.C. 154(b) by 0 days.

(21) Appl. No.: 13/942,165

(22) Filed: Jul. 15, 2013

(65) Prior Publication Data

US 2014/0252253 A1     Sep. 11, 2014

(30) Foreign Application Priority Data

Mar. 8, 2013 (TW) .............................. 102108330 A

(51) Int. Cl.
*F16K 5/02* (2006.01)
*F16K 5/10* (2006.01)

(52) U.S. Cl.
CPC ................. *F16K 5/10* (2013.01); *F16K 5/0214* (2013.01)
USPC ......................................... 251/207; 251/310

(58) Field of Classification Search
USPC .................. 251/205, 206, 207, 208, 209, 310
See application file for complete search history.

(56) References Cited

U.S. PATENT DOCUMENTS

| | | | | |
|---|---|---|---|---|
| 762,936 A | * | 6/1904 | Paige | 137/556.6 |
| 1,925,086 A | * | 9/1933 | Snyder | 123/48 D |
| 3,557,821 A | * | 1/1971 | Siegel et al. | 137/269.5 |
| 5,488,969 A | * | 2/1996 | King et al. | 137/8 |
| 5,580,029 A | * | 12/1996 | Bjerggaard | 251/121 |
| 8,083,208 B2 | * | 12/2011 | Li | 251/207 |
| 2006/0175566 A1 | * | 8/2006 | Albizuri | 251/207 |
| 2009/0140193 A1 | * | 6/2009 | Albizuri Landa | 251/209 |

* cited by examiner

*Primary Examiner* — Matthew W Jellett
(74) *Attorney, Agent, or Firm* — Ming Chow; Sinorica, LLC

(57) ABSTRACT

A plug member of a gas valve includes a main body. The main body has an axial bore in an axial direction, a first inlet and a second inlet in radial directions, and a guiding slot on a surface. The first inlet and the second inlet are connected to the axial bore. A diameter of the first inlet is greater than a diameter of the second inlet. The guiding slot has a first end communicated with the first inlet and a second end communicated with the second inlet, and a width of the guiding slot gradually reduces from the first end to the second end. Therefore, the gas valve may provide a gas flow with a linear change by controlling the plug member.

4 Claims, 10 Drawing Sheets

PLUG MEMBER OF GAS VALVE

The current application claims a foreign priority to the patent application of Taiwan No. 102108330 filed on Mar. 8, 2013.

BACKGROUND OF THE INVENTION

1. Technical Field

The present invention relates to a gas valve, and more particularly to a plug member of a gas valve.

2. Description of Related Art

Typically, a gas valve is mounted on a gas pipe to adjust a gas flow in the pipe. FIG. 1 shows a conventional gas valve, which has a valve body 1 and a plug member 2. The valve body 1 has an inlet 1a and a chamber. The plug member 2 is received in the chamber of the valve body 1 for rotation by control. The plug member 2 has an axial bore 2a, a large bore 2b, a small bore 2c, and an adjusting slot 2d. The axial bore 2a is in a center of the plug member 2 and extends in an axial direction. The large bore 2b, which has a greater diameter than the small bore 2c, extends in a radial direction of the plug member 2, and connects to the axial bore 2a. The adjusting slot 2d is on a surface of the plug member 2, and has an end connected to the large bore 2b. A depth and a width of the adjusting slot 2d gradually reduces from the end connected to the large bore 2b to the other. The small bore 2c is next to adjusting slot 2d and extends to the axial bore 2a.

FIG. 1 shows that the gas valve is providing the maximum gas flow, in which the large bore 2b is right under the inlet 1a. As the plug member 2 is being turned clockwise, from 90° to 247°, the gas flow will gradually reduce because of the adjusting slot 2d. After 247°, the gas valve is shut until the small bore 2c goes to under the inlet 1a. It is clearly shown in FIG. 2 that the gas flow linearly reduces in the beginning, and has a sudden change in the section I. It is because of the gap between the small bore 2c and the adjusting slot 2d. In practice, the plug member 2 is lubricated for a smooth rotation. However, the lubricating oil will flow into the adjusting slot 2d from the end closer to the small bore 2c, and is accumulated at the end where the lubricating oil flows in. It will make a nonlinear change (the dot line of the section II) before the sudden change (section I).

BRIEF SUMMARY OF THE INVENTION

In view of the above, the primary objective of the present invention is to provide a plug member of a gas valve, which provides a gas flow with a linear change.

The present invention provides a plug member, which is incorporated in a gas valve, including a main body. The main body has an axial bore in an axial direction, a first inlet and a second inlet in radial directions, and a guiding slot on a surface. The first inlet and the second inlet are connected to the axial bore. A diameter of the first inlet is greater than a diameter of the second inlet. The guiding slot has a first end communicated with the first inlet and a second end communicated with the second inlet, and a width of the guiding slot gradually reduces from the first end to the second end.

With the plug member, the gas valve may provide a gas flow with a linear change by controlling the plug member.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
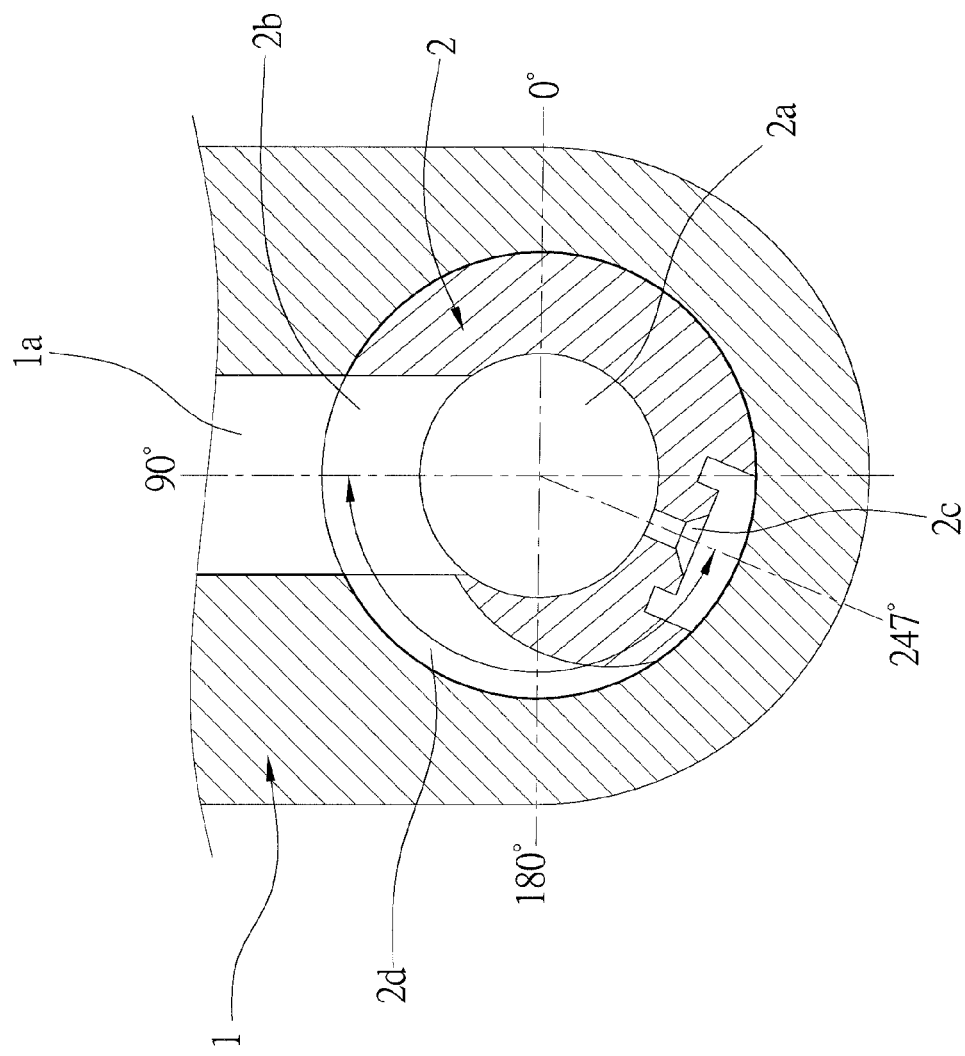
FIG. 1 is a sectional view of the conventional gas valve.
Figure 2:
FIG. 2 shows the relation between the gas flow and the turning angle of the conventional plug member.
Figure 3:
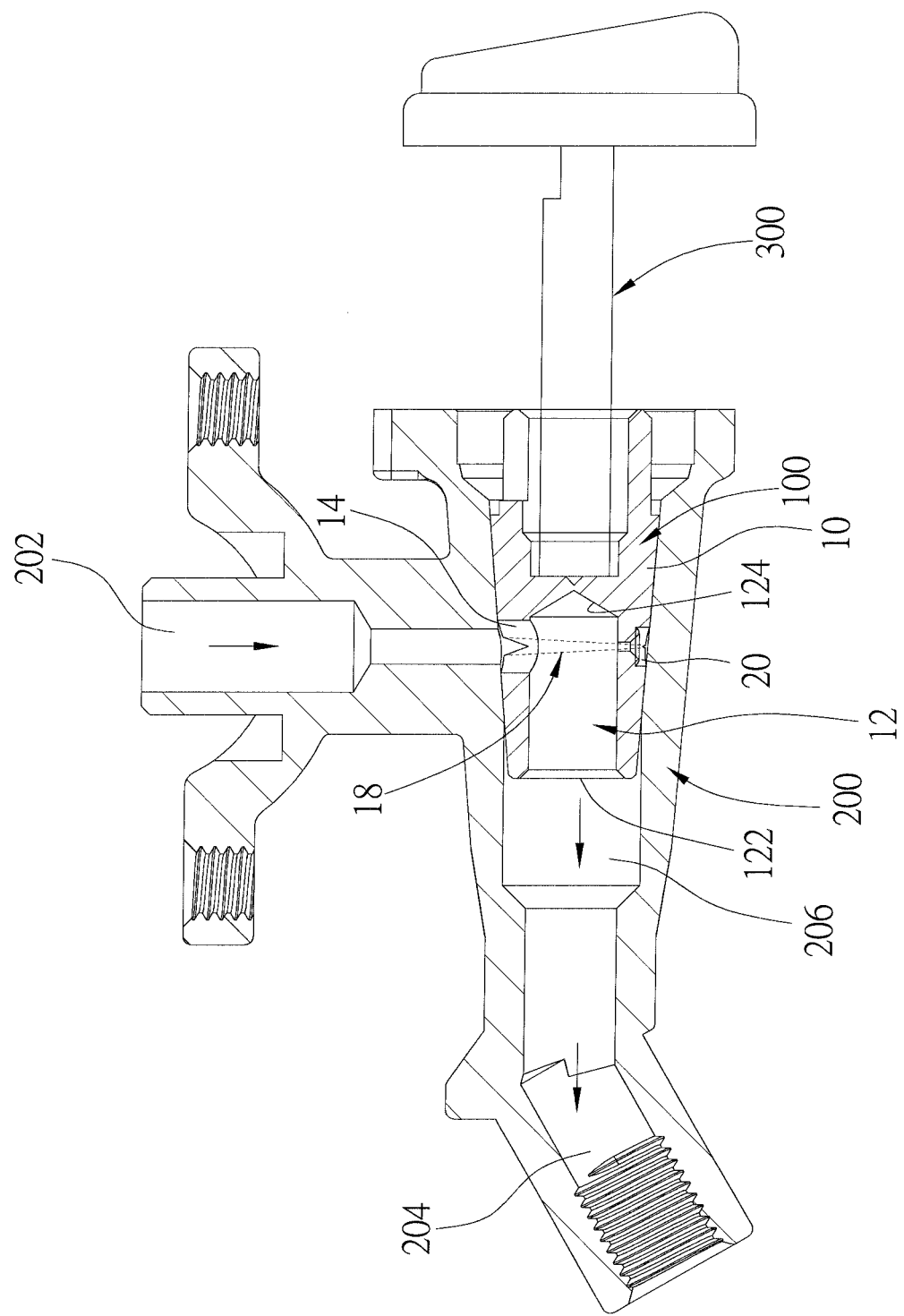
FIG. 3 is a sectional view of the gas valve of the preferred embodiment of the present invention.
Figure 4:
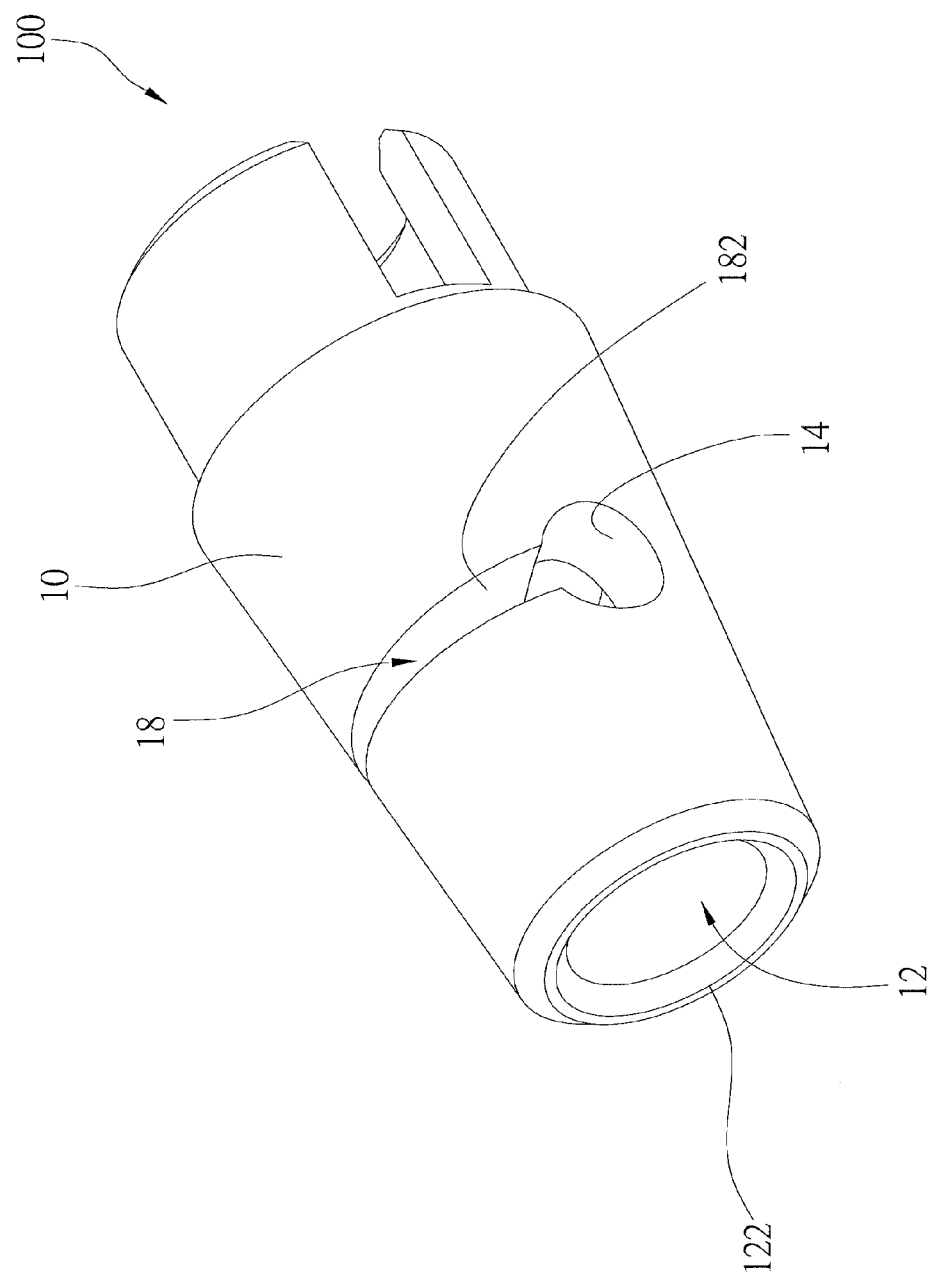
FIG. 4 is a perspective view of the plug member of the preferred embodiment of the present invention, showing the first inlet in connection with the guiding slot.
Figure 5:
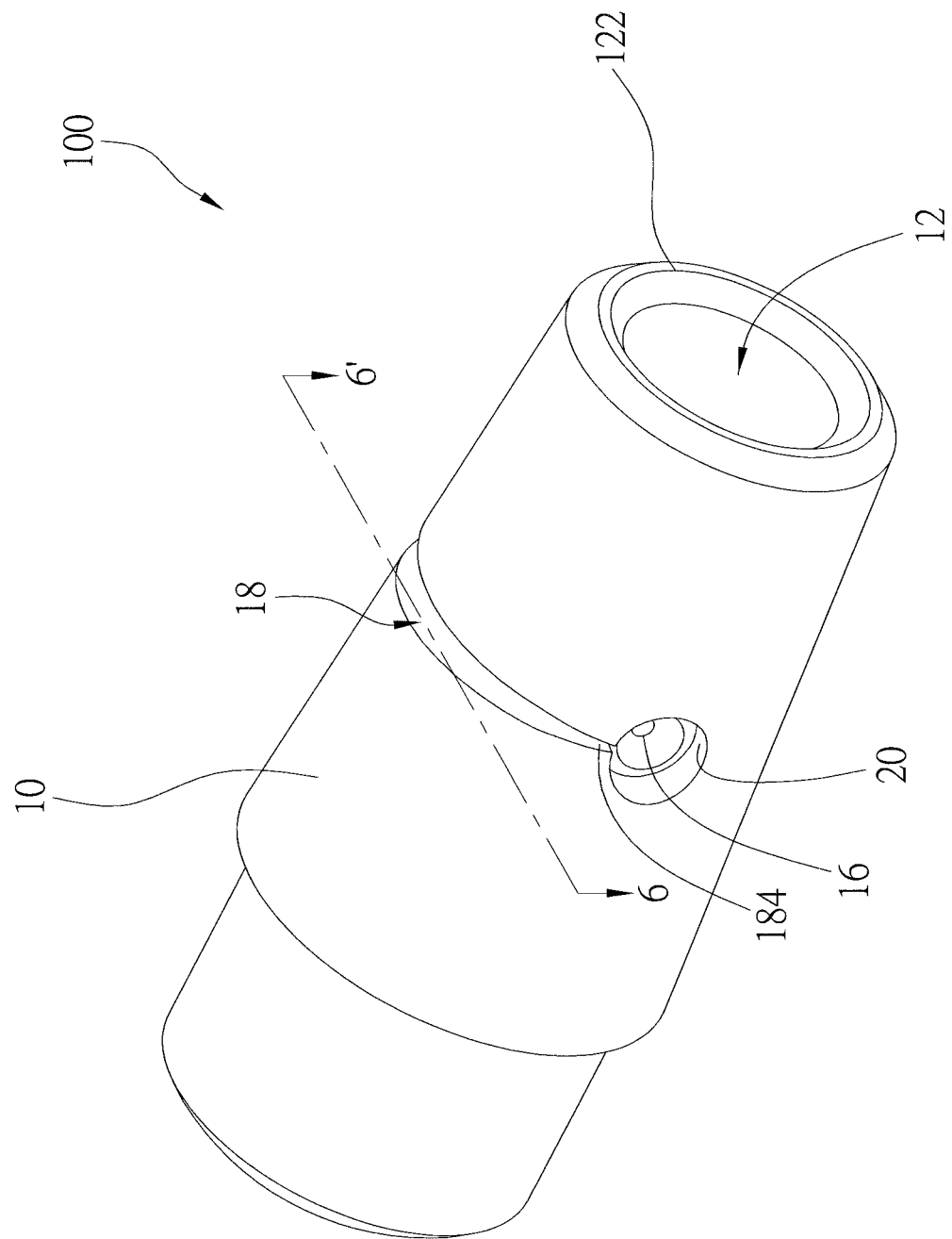
FIG. 5 is another perspective view of the plug member of the preferred embodiment of the present invention, showing the second inlet in connection with the guiding slot.
Figure 6:
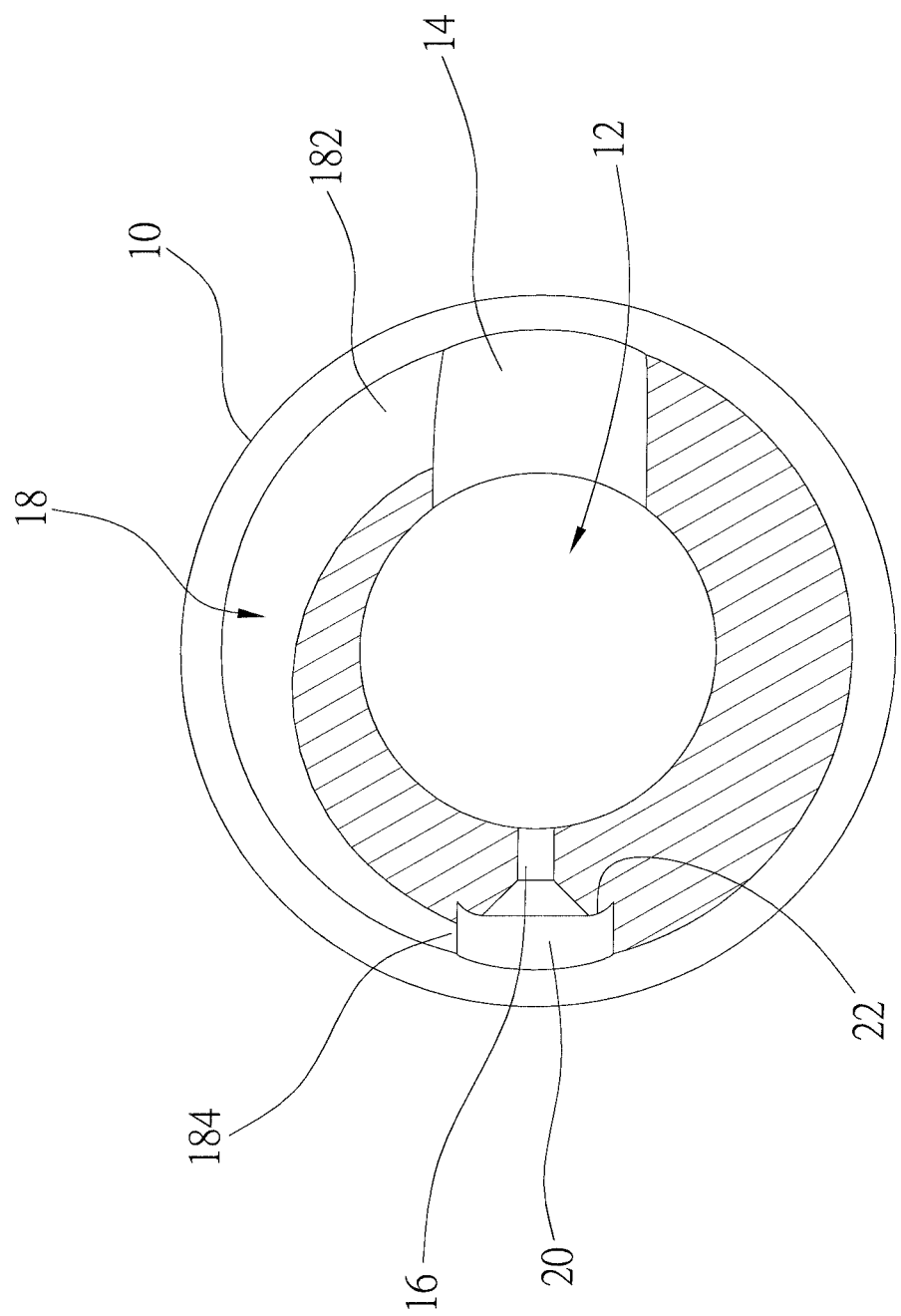
FIG. 6 is a sectional view of the 6-6' line of FIG. 5.

FIG. 3 shows a sectional view of a gas valve of the preferred embodiment of the present invention, which includes a plug member 100, a valve body 200, and a stem 300. The valve body 200 has an inlet 202, an outlet 204, and a chamber 206 between the inlet 202 and the outlet 204. The plug member 100 is received in the chamber 206 of the valve body 200, and the stem 300 is connected to the plug member 100, whereby a user may operate the stem 300 to turn the plug member 100.

Figure 7:
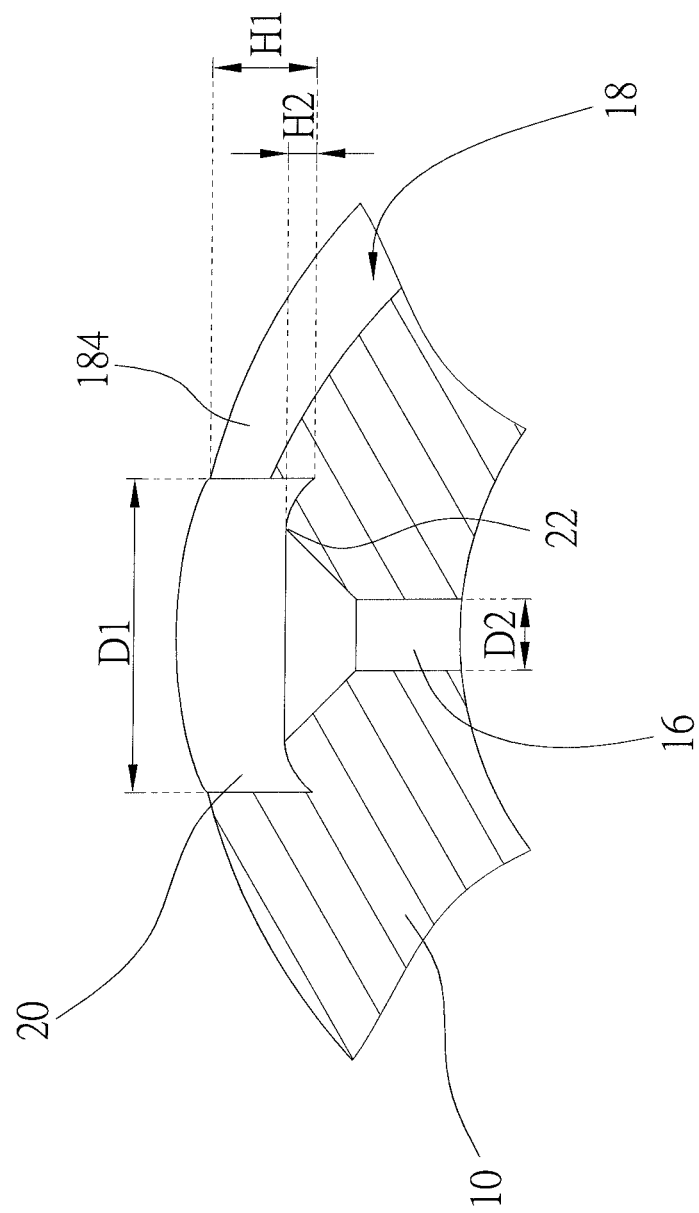
FIG. 7 is a sectional view of the plug member of the preferred embodiment of the present invention.

As shown in FIG. 4 to FIG. 8, the plug member 100 has a main body 10, which has an axial bore 12 in an axial direction, a first inlet 14 and a second inlet 16 in radial directions, and a guiding slot 18 on a surface thereof. The axial bore 12 has an open end 122 and a close end 124. The open end 122 of the axial bore 12 is connected to the outlet 204 of the valve body 200. The first inlet 14 and the second inlet 16 are connected to the axial bore 12, and a diameter of the first inlet 14 is greater than that of the second inlet 16. As shown in FIG. 7, the main body 10 further has a recess 20 on the surface, and the second inlet 16 has an end on a bottom of the slot 20. A diameter D1 of the recess 20 is greater than the diameter D2 of the second inlet 16. The main body 10 further has an annular protrusion 22 on the bottom of the recess 20 which surrounds the second inlet 16. A depth H1 of the recess 20 is greater than a height H2 of the protrusion 22.

Figure 8:
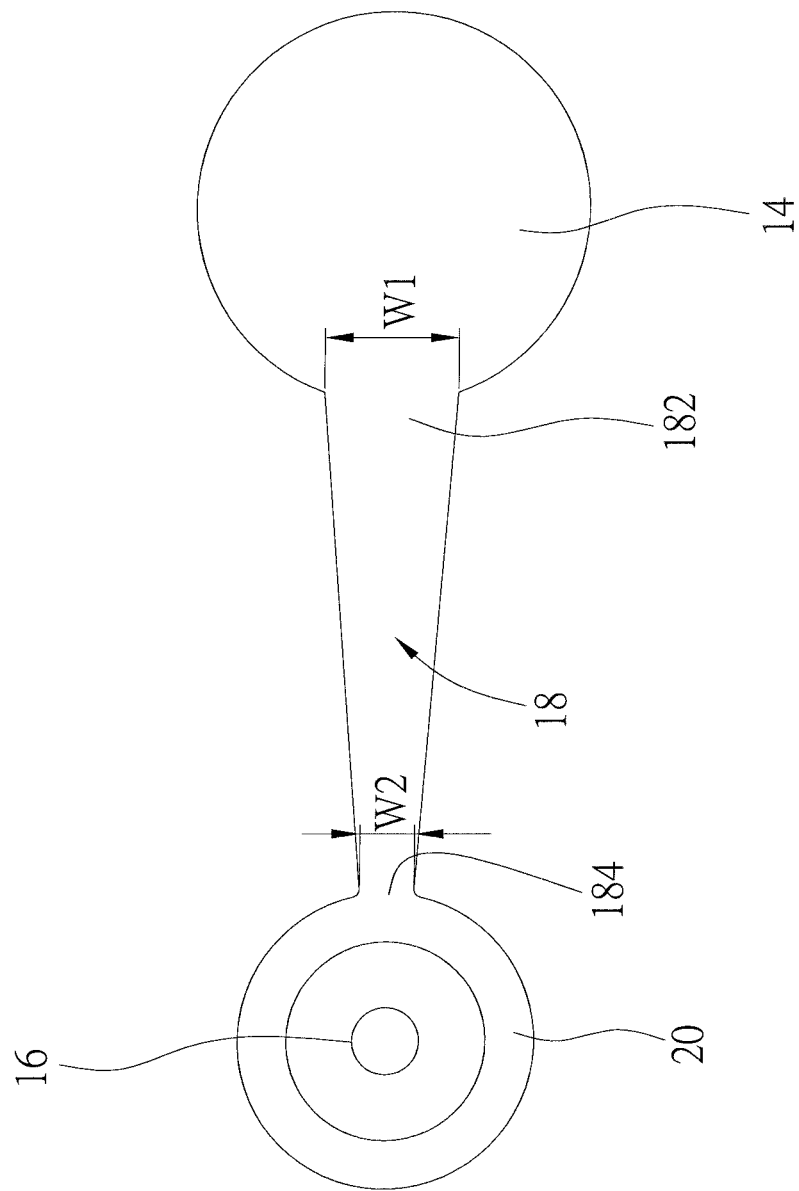
FIG. 8 shows the surface of the plug member of the preferred embodiment of the present invention.

As shown in FIG. 8, the guiding slot 18 has a first end 182 and a second end 184. The guiding slot 18 is communicated with the first inlet 14 at the first end 182, and is communicated with the recess 20 at the second end 184. In other words, the first inlet 14 is communicated with the second inlet 16 through the guiding slot 18 and the recess 20. A width of the guiding slot 18 gradually reduces from the first end 182 to the second end 184, which means that the width W1 at the first end 182 is greater than the width W2 at the second end 184.

Figure 9:
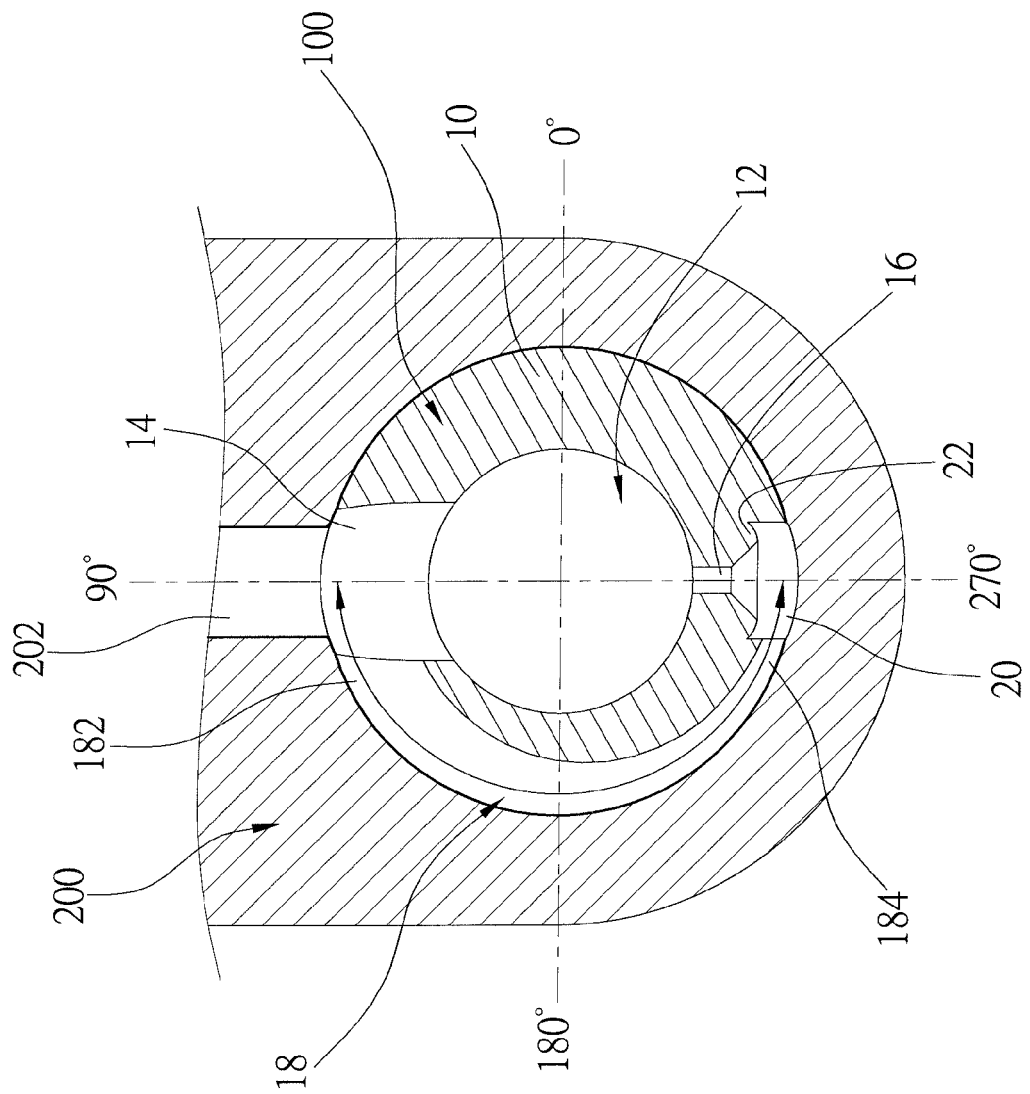
FIG. 9 is another sectional view of the gas valve of the preferred embodiment of the present invention.
Figure 10:
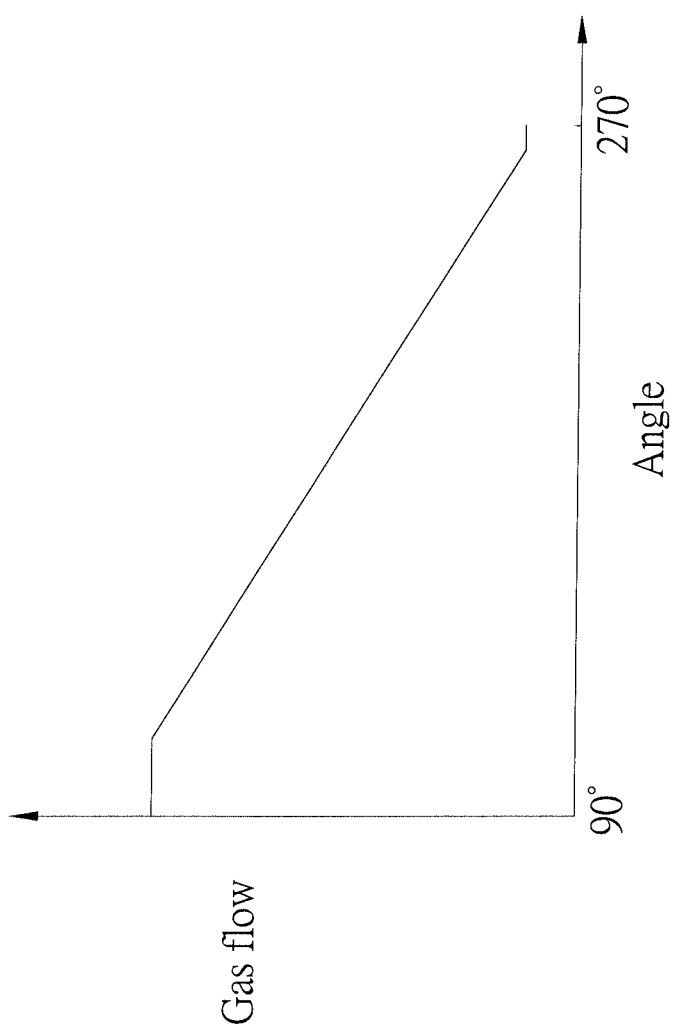
FIG. 10 shows a relation between the gas flow and the angle of the plug member.

As shown in FIG. 9, while the plug member 100 is rotating, a gas flow through the gas valve is linearly changed because of the first inlet 14, the second inlet 16 and the guiding slot 18. FIG. 9 shows the first inlet 14 is right under the inlet 202. When the plug member 100 is turned for 180° (from 90° to 270°), it is the second inlet 16 under the inlet 202. While the plug member 100 is rotating counterclockwise from 90° to 270°, a gas flow through the gas valve linearly reduces because of the guiding slot 18 with a gradually narrowed width. No sudden change will happen to the gas flow provided by the gas valve while the plug member 100 is rotating.

Furthermore, the lubricating oil will not be accumulated in the guiding slot 18 while the plug member 100 is rotating because the guiding slot 18 is connected to the recess 20. It may avoid the nonlinear change. Besides, the protrusion 22 surrounds the second inlet 16 that may block the lubricating oil to avoid it flowing into the second inlet 16.

The main feature of the present invention is the plug member which may be incorporated in any type of the gas valve. It must be pointed out that the embodiments described above are only some preferred embodiments of the present invention. All equivalent methods which employ the concepts disclosed in this specification and the appended claims should fall within the scope of the present invention.

What is claimed is:

1. A plug member, which is incorporated in a gas valve, comprising a main body, having an axial bore in an axial direction, a first inlet and a second inlet in radial directions, and a guiding slot on a surface, wherein the first inlet and the second inlet are connected to the axial bore; a diameter of the first inlet is greater than a diameter of the second inlet; the guiding slot has a first end communicated with the first inlet and a second end communicated with the second inlet; a width of the guiding slot gradually reduces from the first end to the second end; wherein the guiding slot is concaved from the surface of the main body from the first end to the second end; wherein the main body further has a recess on the surface thereof; an end of the second inlet is connected to a bottom of the recess; a diameter of the recess is greater than the width of the guiding slot at the second end.

2. The plug member of claim 1, wherein a diameter of the recess is greater than the diameter of the second inlet; and the second end of the guiding slot is connected to the recess.

3. The plug member of claim 2, wherein the main body further has a protrusion on a bottom of the recess which surrounds the second inlet.

4. The plug member of claim 3, wherein a depth of the recess is greater than a height of the protrusion.

* * * * *